(No Model.)

R. M. HUNTER.
ELECTRIC RAILWAY.

No. 508,388. Patented Nov. 7, 1893.

Attest
C. H. Dillerich.
H. L. Motherwell.

Inventor
R. M. Hunter

THE NATIONAL LITHOGRAPHING COMPANY,
WASHINGTON, D. C.

UNITED STATES PATENT OFFICE.

RUDOLPH M. HUNTER, OF PHILADELPHIA, PENNSYLVANIA, ASSIGNOR TO THE ELECTRIC CAR COMPANY OF AMERICA, OF SAME PLACE.

ELECTRIC RAILWAY.

SPECIFICATION forming part of Letters Patent No. 508,388, dated November 7, 1893.

Original application filed November 30, 1886, Serial No. 220,240. Divided and this application filed April 21, 1893. Serial No. 471,245. (No model.)

*To all whom it may concern:*

Be it known that I, RUDOLPH M. HUNTER, of the city and county of Philadelphia and State of Pennsylvania, have invented an Improvement in Electric Railways, of which the following is a specification.

My invention has reference to electric railways, and consists of certain improvements which are fully set forth in the following specification and shown in the accompanying drawings which form a part thereof.

This application, Case No. 252, is a division of my application, Serial No. 220,240, filed November 30, 1886, and comprehends certain improvements in electric railways more particularly relating to the general system of electrical distribution.

The invention may be stated as an electric railway having out going and return conductors to supply current to the motors on the cars and receiving current from a constant potential and varying current dynamo or generating machine, combined with two or more electrically propelled cars, each having a series wound electric motor mechanically connected to rotate the axles of the car and receive current from the out going and return conductors, and with which conductors the several motors of the cars are coupled in parallel. Each of the cars is provided with independent current controlling devices for controlling the current delivered to the motors while maintaining them as series motors and in parallel with each other. In addition to these features, the motors may be provided with current reversing devices for reversing the electric motor of one car independently of that of another car. These features are more specifically set out in the claims.

Figure 1:
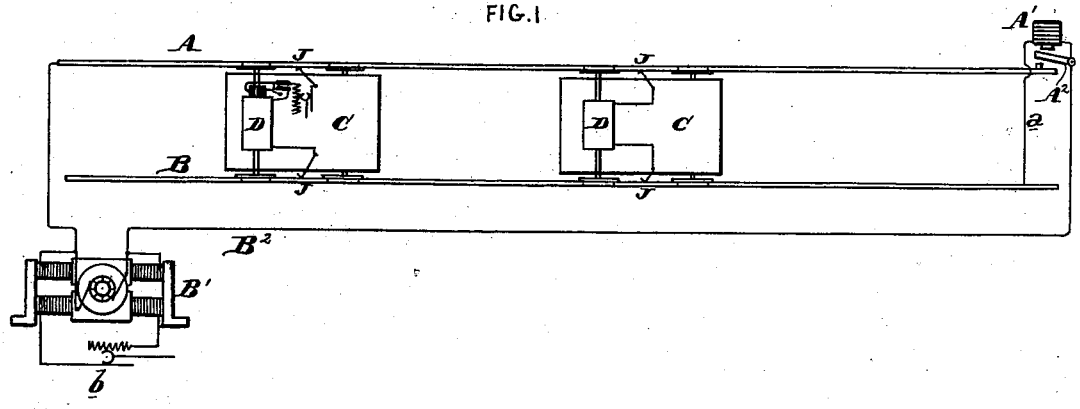
Figure 2:
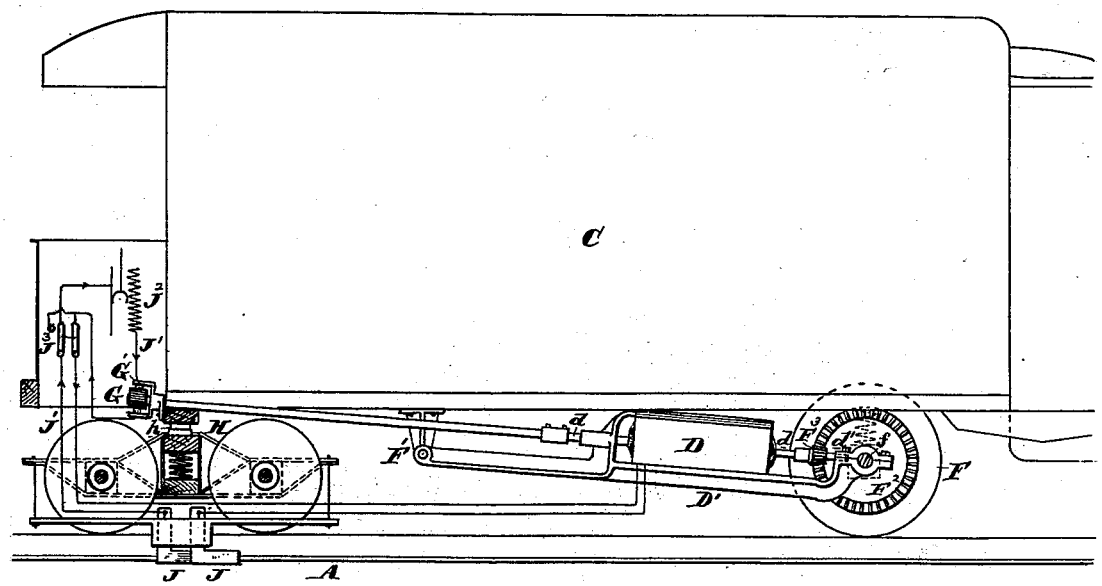

In the drawings:—Figure 1 is a diagram illustrating an electric railway embodying my invention; and Fig. 2 is a side elevation illustrating an electric car adapted to my improvement.

A and B are two lines of working conductors and supply current of opposite polarities to the electrically propelled vehicles. The conductors may be either the rails or auxiliary conductors, suspended, exposed on the surface of the roadbed, or placed in a slotted conduit. One end of the conductor A is connected with one terminal of the generator B'. The distant end of the conductor A is connected with the other terminal of the generator B' through a switch $A^2$ and the return circuit $B^2$. The distant end of the conductor B is connected with the return circuit by a conductor $a$ including an electro magnet A' adapted to lift the switch $A^2$ when one or more cars are in circuit, so as to force the current to pass from the conductor A through the motors on the cars to the conductor B. It is immaterial to my invention what the particular system of conductors may be.

The generator B' may be supplied with the regulator $b$ or other suitable regulating device, and is shunt or compound wound so as to be self regulating and give a varying current in ampères while maintaining a constant potential.

C are electrically propelled vehicles, cars or locomotives. These cars maintain electrical connection with the conductors A, B, by suitable collectors J. D are the motors on the said cars, and J' is the motor circuit which may have a resistance changer or regulator $J^2$ under the control of the operator to vary the speed or power of the motor or stop the car, and a current reversing switch $J^3$ for reversing the motor.

The car shown in Fig. 2 consists of a long body supported at its forward end upon a truck H by a pivot $h$. The truck may be made in any well known manner having suitable springs. The rear end of the car body is supported on wheels F secured to their axle $f$ which is journaled in boxes in the usual way, and support the car body through springs in any suitable manner. The car may be constructed in any manner desired.

D is the electric motor and is supported on the frame D' journaled or hinged upon the rear axle $f$, and at its forward end is connected at F' to the car body. By this means the car body may rise and fall on its springs without changing the distance between the motor and axle $f$. The motor shaft $d$ is supported in journals $d'$ close to the axle $f$ and is geared in any suitable manner with the axle. I do not limit myself to any particular connection between the motor shaft and car axle as there are a number of connections or power transmitters which might be used. The motor may be of any suitable construction, and is a series wound machine and may have either the armature or field magnets to rotate. The current regulators J may be of any suitable construction adapted to make connection with the conductors A, B.

$J^3$ is a reversing switch for the electric motor.

There may be any number of cars working in connection with the conductors A and B, but all of the motors are maintained as series motors while being coupled in parallel relation with respect to each other and the conductors A and B. According as to the work or duty of the cars, more or less current will be drawn from the conductors A and B, and consequently the constant potential generator B' supplies a varying amount of current to satisfy the demand while maintaining a substantially constant potential.

I have described the general features of my improvement, but it is to be understood that I do not limit myself to the details, as they may be modified in various ways without departing from my invention.

What I claim as new, and desire to secure by Letters Patent, is—

1. In an electric railway, the combination of outgoing and return conductors to supply current to the motors on the cars, a constant potential and varying current dynamo or generating machine for supplying current to the conductors, two or more electrically propelled cars connected with the conductors in parallel, a series wound electric motor arranged upon each of said cars and mechanically connected to rotate their axles, independent current collecting devices for each car for supplying current to the motors, and independent regulating devices upon each car for controlling the current delivered to the motors while maintaining them as series motors and in parallel with each other.

2. In an electric railway, the combination of outgoing and return conductors to supply current to the motors on the cars, a constant potential and varying current dynamo or generating machine for supplying current to the conductors, two or more electrically propelled cars connected with the conductors in parallel, a series wound electric motor arranged upon each of said cars and mechanically connected to rotate their axles, independent current collecting devices for each car for supplying current to the motors, and independent regulating devices upon each car for controlling the current delivered to the motors while maintaining them as series wound motors and in parallel with each other, and independent current reversing devices for reversing the electric motor upon one car independently of that on another.

In testimony of which invention I have hereunto set my hand.

R. M. HUNTER.

Witnesses:
ERNEST HOWARD HUNTER,
C. M. DIETTERICH.